April 30, 1940. J. M. W. CHAMBERLAIN ET AL 2,198,861

TOWER PACKING

Filed Feb. 28, 1939

INVENTOR
James M. W. Chamberlin & Harold A. Burnip
BY
Willard D. Eakin
ATTORNEY

Patented Apr. 30, 1940

2,198,861

UNITED STATES PATENT OFFICE 2,198,861

TOWER PACKING

James M. W. Chamberlain, Akron, and Harold A. Burnip, Cleveland, Ohio, assignors to United States Stoneware Company, Akron, Ohio, a corporation of Ohio Application February 28, 1939, Serial No. 258,976

3 Claims. (Cl. 261—95)

This invention relates to baffle members adapted to be used in chemical reaction towers or the like or other contact apparatus for liquids and gases, for obtaining a high area of surface exposure of the liquid to the gas.

Its chief objects are to provide baffle members adapted to be placed in the tower or the like in bulk and in random relation to each other and, in the use of such baffle members, to provide high area of surface contact; to provide even distribution of the liquid; to provide small impedance of the flow of the gas; to provide small impedance of the flow of the liquid; to avoid pocketing or excessive local accumulation of the liquid or of the gas; to provide baffle members that can be made of frangible material such as a ceramic material, for chemical inertness, without excessive breakage of the members; to provide baffle members that can be inexpensively produced; to avoid excessive wall thrust; and to provide baffle members which, in being poured into the tower or the like will not be highly subject to the objection of arranging themselves in selective positions or such positions in different parts of the stack as to result in different impedance to flow in different parts of the stack.

Figure 1:
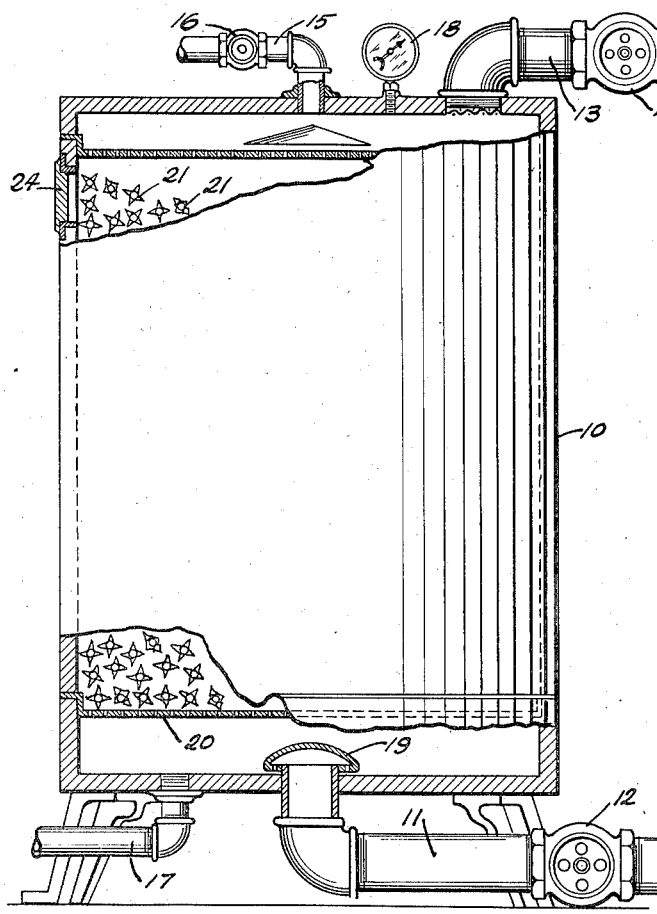
Fig. 1 is a vertical section of a reaction tower containing baffle members embodying our invention, parts of the apparatus being shown in elevation.

Referring to the drawing, Fig. 1 shows, somewhat diagrammatically, and for purposes of illustration only and not of limitation, a reaction tower 10, which may be provided with any desired piping and other fittings, such as a gas inlet pipe 11 having a valve 12, a gas outlet pipe 13 having a valve 14, a liquid-inlet pipe 15 having a valve 16, a liquid-outlet pipe 17, a pressure gage 18, a liquid-retaining hood or cap 19 on the gas inlet pipe 11, a perforated false floor 20, for supporting the stack of baffle members 21, 21 while permitting liquid and gas to pass through it, a deflector cone 22 mounted in the upper part of the tower for spreading a liquid flowing into the tower from the liquid-inlet pipe 15, a perforated distributing plate 23 extending across the tower just below the distributing cone 22 to provide further for distributing the liquid more uniformly onto the stack of baffles throughout the cross-section of the tower, and a filler opening and cap 24 for the introduction of the baffle members into the tower.

The baffle members, preferably but not necessarily of like size and shape throughout the stack, are of what may roughly be called star shape, but it is preferred that each baffle member have arms extending from its base in more than one "plane", primarily to avoid adjacent baffle members arranging themselves with a substantial area of one in contact or near-contact with a substantial area of the other, such as would by capillary attraction or otherwise, as by pocketing, cause local accumulation or retention of liquid.

Preferably also the arms are outwardly tapered, for the same reason and to provide a desirable relationship of strength, extent of surface and economy of material.

Figure 2:
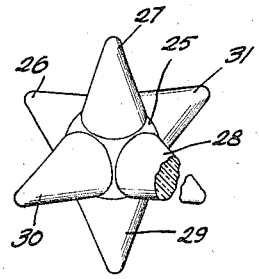
Fig. 2 is a perspective view of a baffle member embodying our invention in one of its preferred forms, a part being broken away to indicate that the member can be made of ceramic material.

In Fig. 2, for example, the baffle member comprises a body portion 25, which may be generally spherical, as shown, and, projecting from it with their axes in one plane are conical, outwardly tapered arms 26, 27, 28, 29 and, in the same plane with the axes of the arms 27 and 29, at right angles to the first mentioned plane, are arms 30 and 31. The arms join the spherical body portions with less acute surface angles than would be present if the conical surfaces at the bases of the arms were extended to intersect each other, and thus accumulation and retention of liquid in the angles is relatively small.

Figure 3:
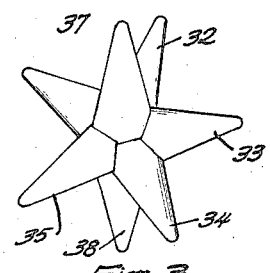
Fig. 3 is a perspective view of a baffle member illustrating the invention in a slightly modified form.

In Fig. 3 the conical arms merge at their bases, as cones, to form the base of the member, and in this embodiment there are, with their axes in the same plane, five arms 32, 33, 34, 35, 36 and, perpendicular to that plane, are what might be termed vertical or axially disposed arms 37 and 38.

Figure 4:
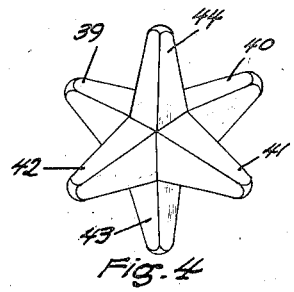
Fig. 4 is a perspective view of another modification.

In Fig. 4 the arms are rectangularly pyramidal and so merge at their bases that their cross-sections at that position define a cube, there being, with their axes in one plane, four arms 39, 40, 41, 42, and, with their axes in a plane at right angles thereto, vertical or axially disposed arms 43 and 44.

Figure 5:
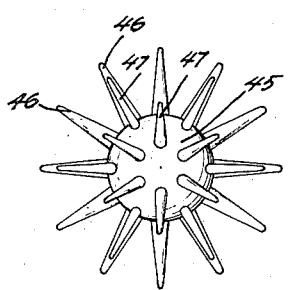
Fig. 5 is a perspective view of still another modification.

The pyramidal form of the arms give a relatively high ratio of surface area to the amount of material required as compared with the conical arms of Fig. 2, 3 or 5, but permit more extensive contact or near-contact between surfaces of adjacent members when flat faces of adjacent members happen to be presented to each other.

In Fig. 5 a spherical body 45 has a large number of conical arms projecting from it in radial, spaced-apart positions, and these may consist of arms 46, 46 of relatively large size and other arms 47, 47 of relatively small size, for selective positioning of the members, by hand or otherwise, although, for random arrangement, it is preferred to employ forms such, as in Figs. 2, 3, and 4, that the flow capacity, or its reciprocal the impedance, will be substantially the same throughout the stack regardless of the attitudes assumed by the individual members. In all of these forms, shelving of liquid is avoided.

The general advantages of the invention are indicated by the foregoing statement of objects and further modifications are possible without sacrifice of all of the advantages.

We claim:

1. A tower packing comprising a multiplicity of baffle members in random arrangement, each of said members comprising a solid central body portion and prong-like arms projecting therefrom with their axes in a plurality of planes.

2. A tower packing comprising a multiplicity of baffle members in random arrangement, each of said members comprising a solid central body portion and prong-like, outwardly tapered arms projecting therefrom with their axes in a plurality of planes.

3. A tower packing comprising a multiplicity of baffle members in random arrangement, each of said members comprising a solid central body portion and prong-like arms projecting therefrom with their axes in a plurality of planes, substantially all of the surfaces of the member being convex.

JAMES M. W. CHAMBERLAIN.
HAROLD E. BURNIP.